United States Patent [19]
Pinto et al.

[11] 3,771,938
[45] Nov. 13, 1973

[54] APPARATUS FOR FORMING THIN PLASTIC PACKAGING TRAYS

[76] Inventors: Albert Pinto, White Plains, N.Y.; Arthur J. Griner, Wyckoff, N.J.

[22] Filed: Oct. 27, 1972

[21] Appl. No.: 301,523

Related U.S. Application Data

[63] Continuation of Ser. No. 96,568, Dec. 9, 1970, abandoned.

[52] U.S. Cl........... 425/174 HR, 425/292, 425/294, 425/302, 425/388, 425/397, 264/92
[51] Int. Cl............................................. B29c 17/04
[58] Field of Search.................... 425/174, 195, 292, 425/264, 388, 397, 302; 83/171; 264/163, 90, 92

[56] References Cited
UNITED STATES PATENTS

| | | | |
|---|---|---|---|
| 3,026,566 | 3/1962 | Martelli et al. | 425/388 X |
| 3,054,441 | 9/1962 | Gex et al. | 83/171 X |
| 3,218,776 | 11/1965 | Cloud | 53/30 |
| 3,369,274 | 2/1968 | Dicks et al. | 425/174 |
| 3,479,694 | 11/1969 | Winstead | 425/388 X |
| 3,518,334 | 6/1970 | Carrigan et al. | 425/195 X |
| 3,518,725 | 7/1970 | Donafrio | 425/195 X |
| 3,587,377 | 6/1971 | Olson et al. | 83/171 |

*Primary Examiner*—Robert L. Spicer, Jr.
*Attorney*—Gerald Durstewitz et al.

[57] ABSTRACT

A machine for forming thin plastic packaging trays of dished configuration with an upper peripheral edge which lies within a single plane The machine includes a plurality of flat faced vacuum form molds carried on the periphery of a rotating drum. A ribbon of plastic material is continuously delivered to the drum and mechanically clamped to the surface of each mold in consecutive order as the drum rotates. Each section of clamped ribbon is carried past a radiant heater and a vacuum is then applied to draw the softened plastic into the mold. The clamps are disengaged and the trays are held in the molds by a continued application of vacuum while a heated blade moving in a repetitive closed curvilinear path severs the ribbon between adjacent trays and while a pair of rotating knives trim the edges of the trays. A vacuum operated picker removes the trays from the drum and deposits them on a conveyor.

10 Claims, 23 Drawing Figures

United States Patent [19]
Pinto et al.
[11] 3,771,938
[45] Nov. 13, 1973
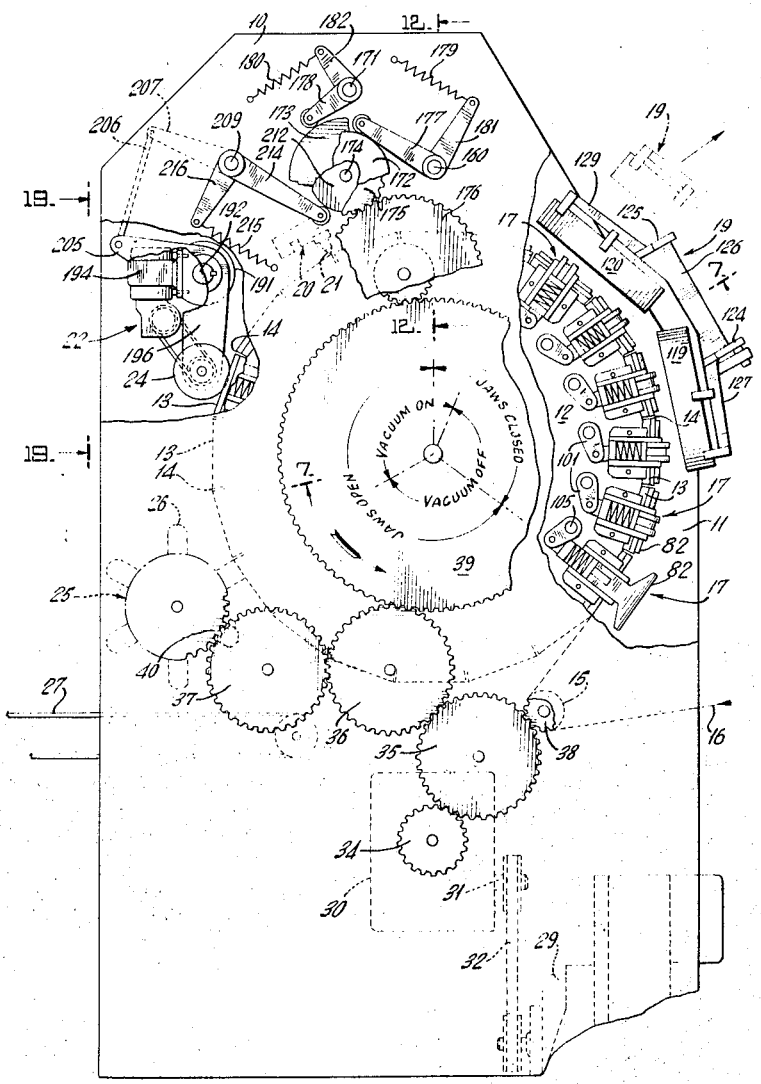

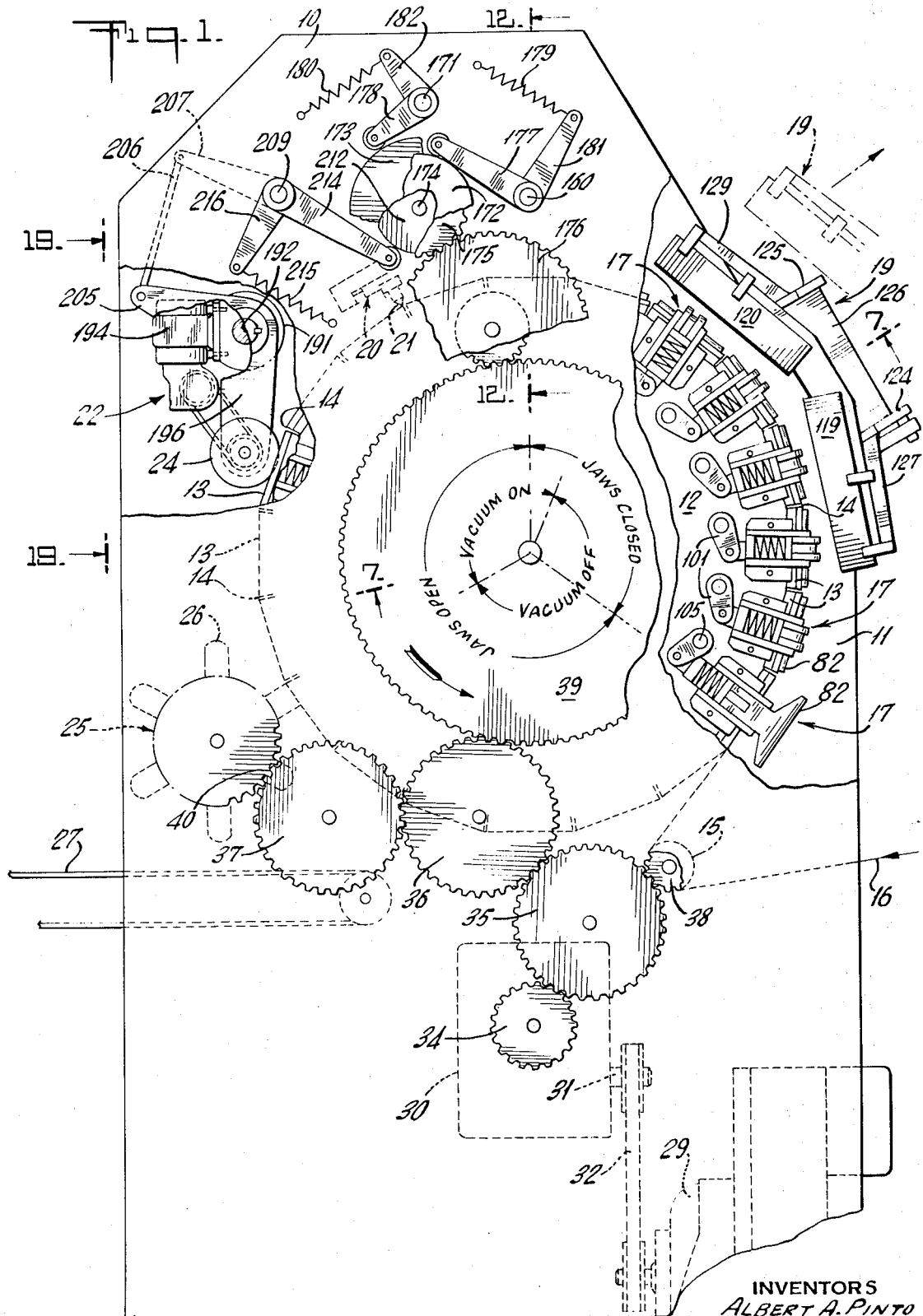

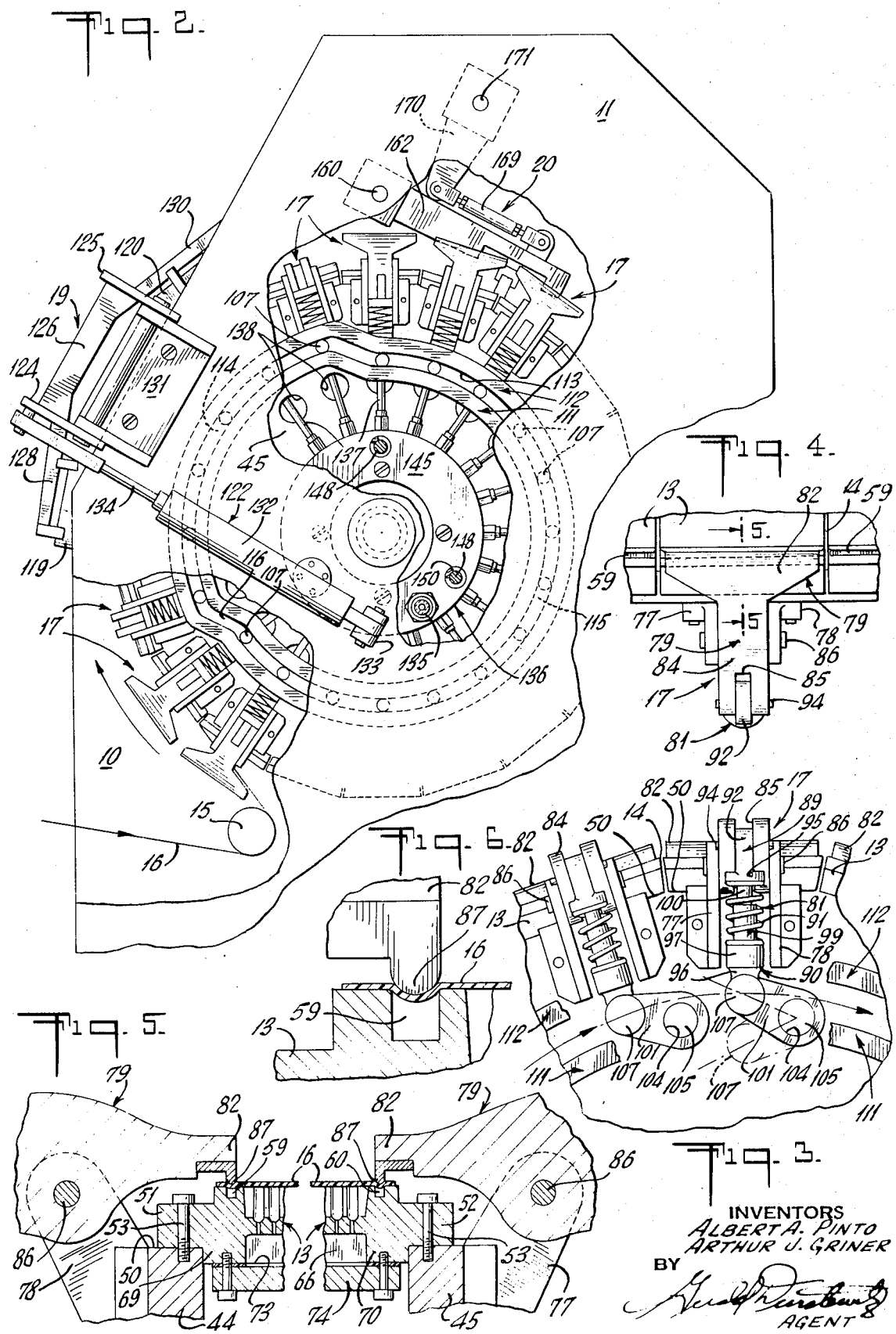

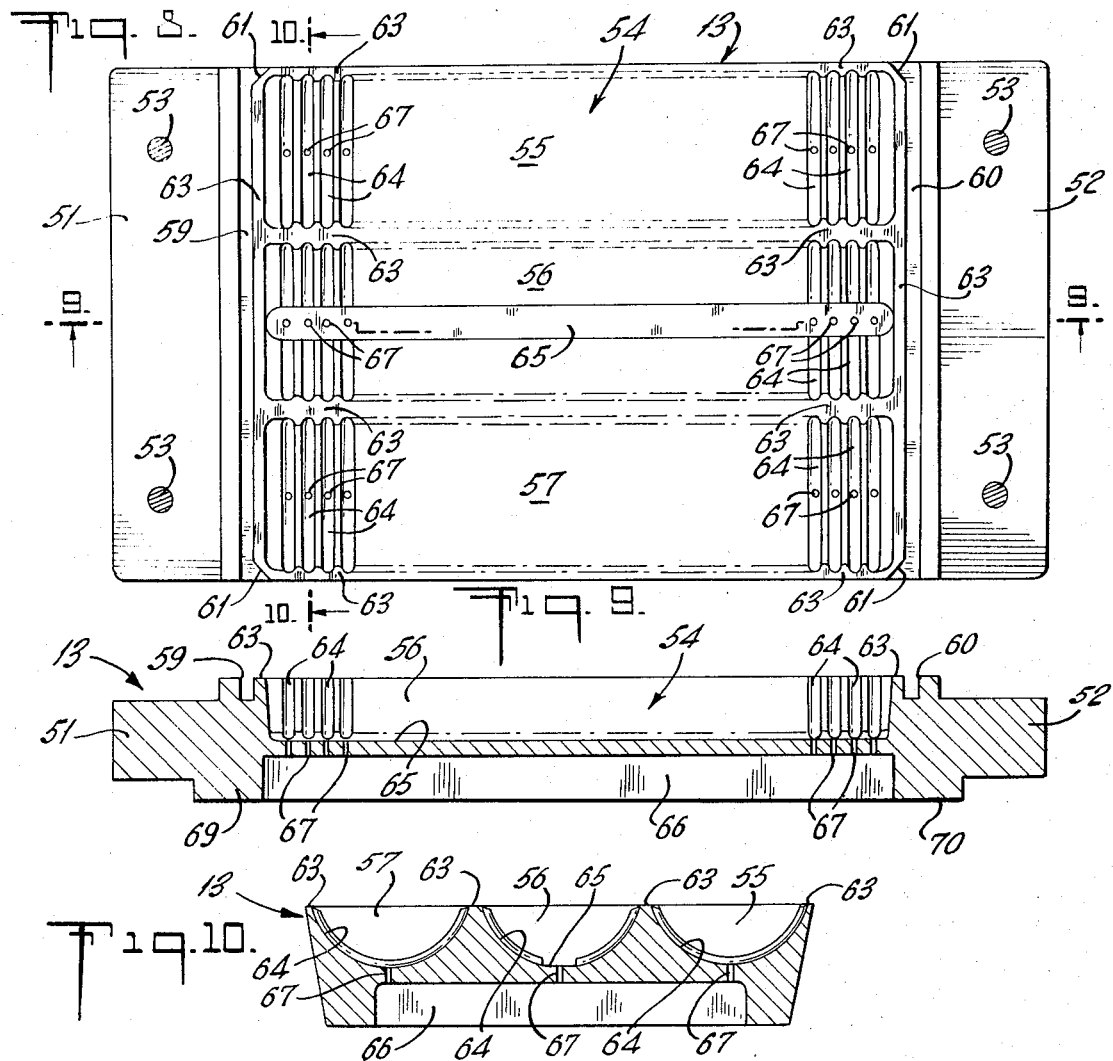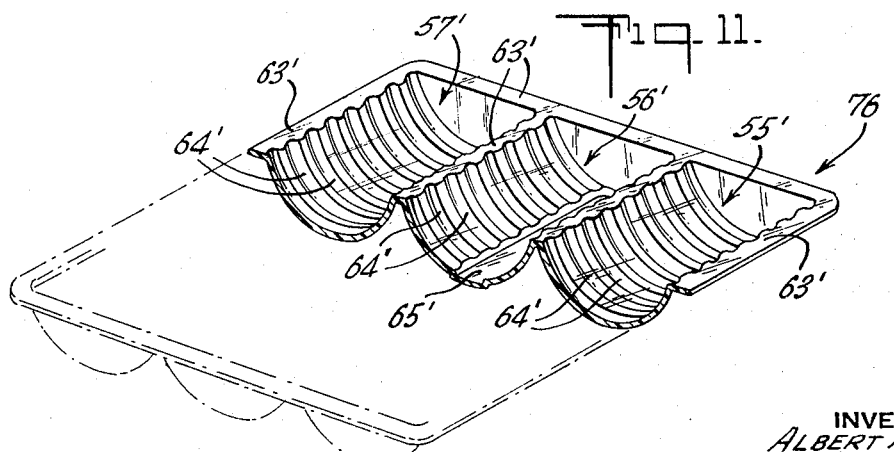

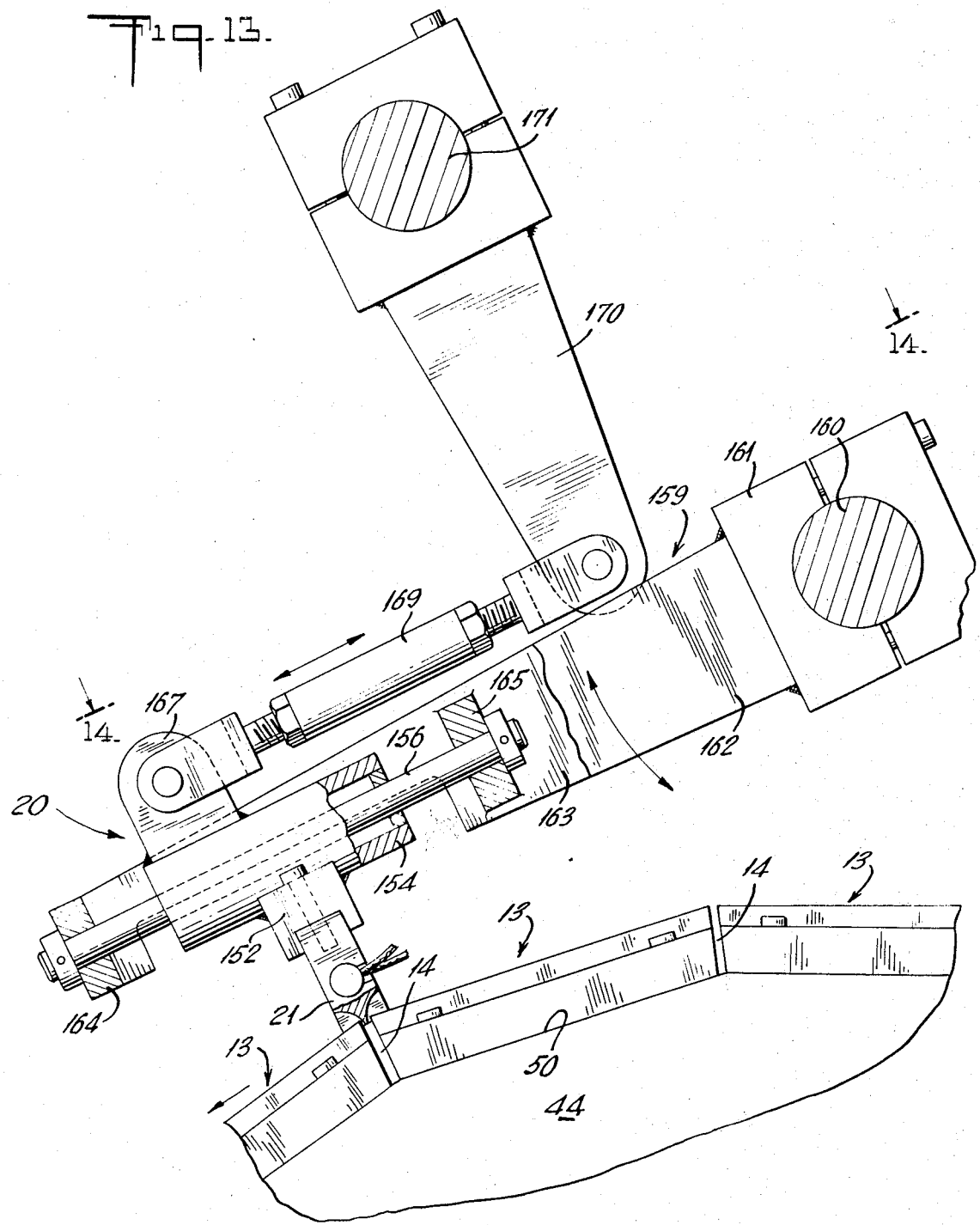

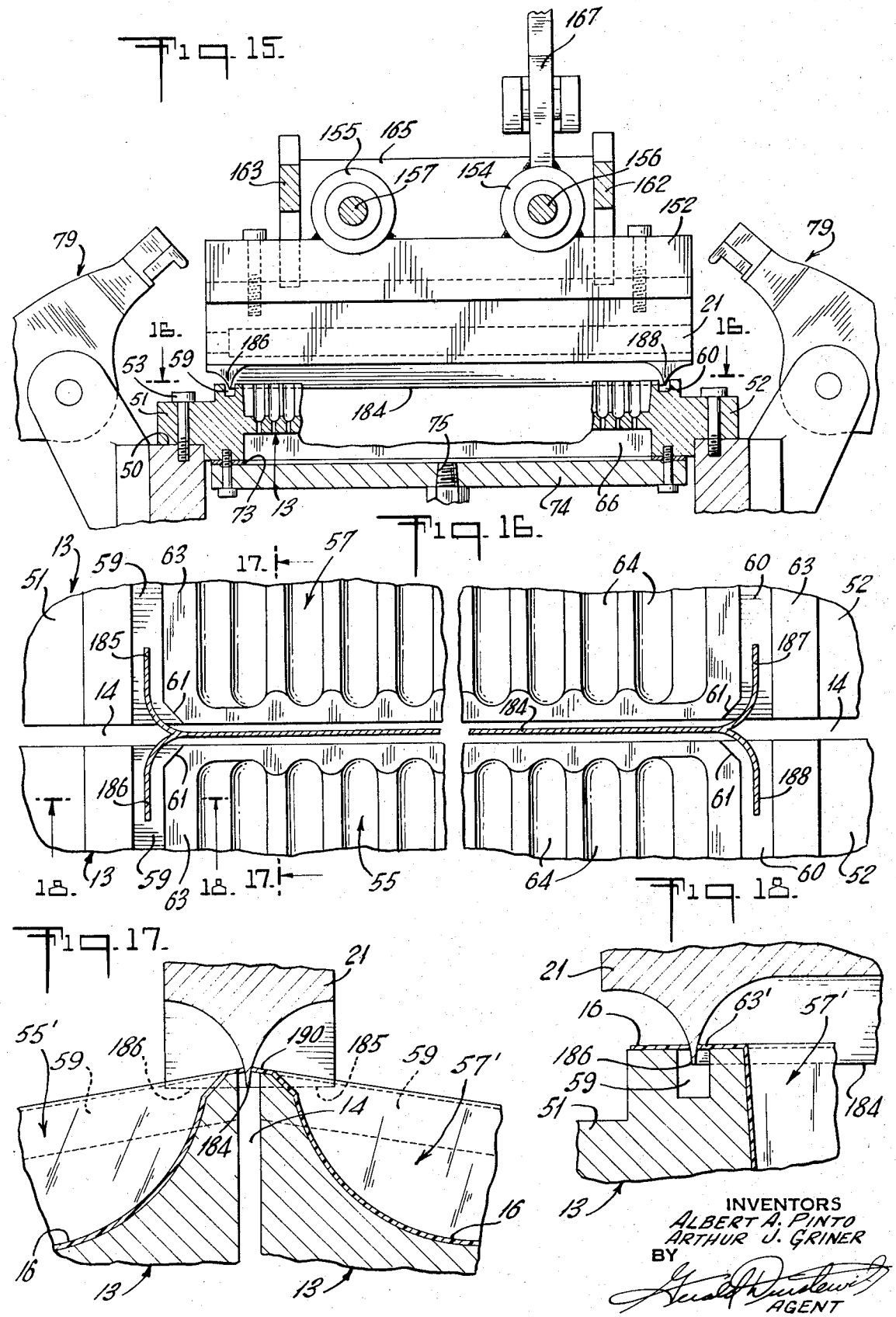

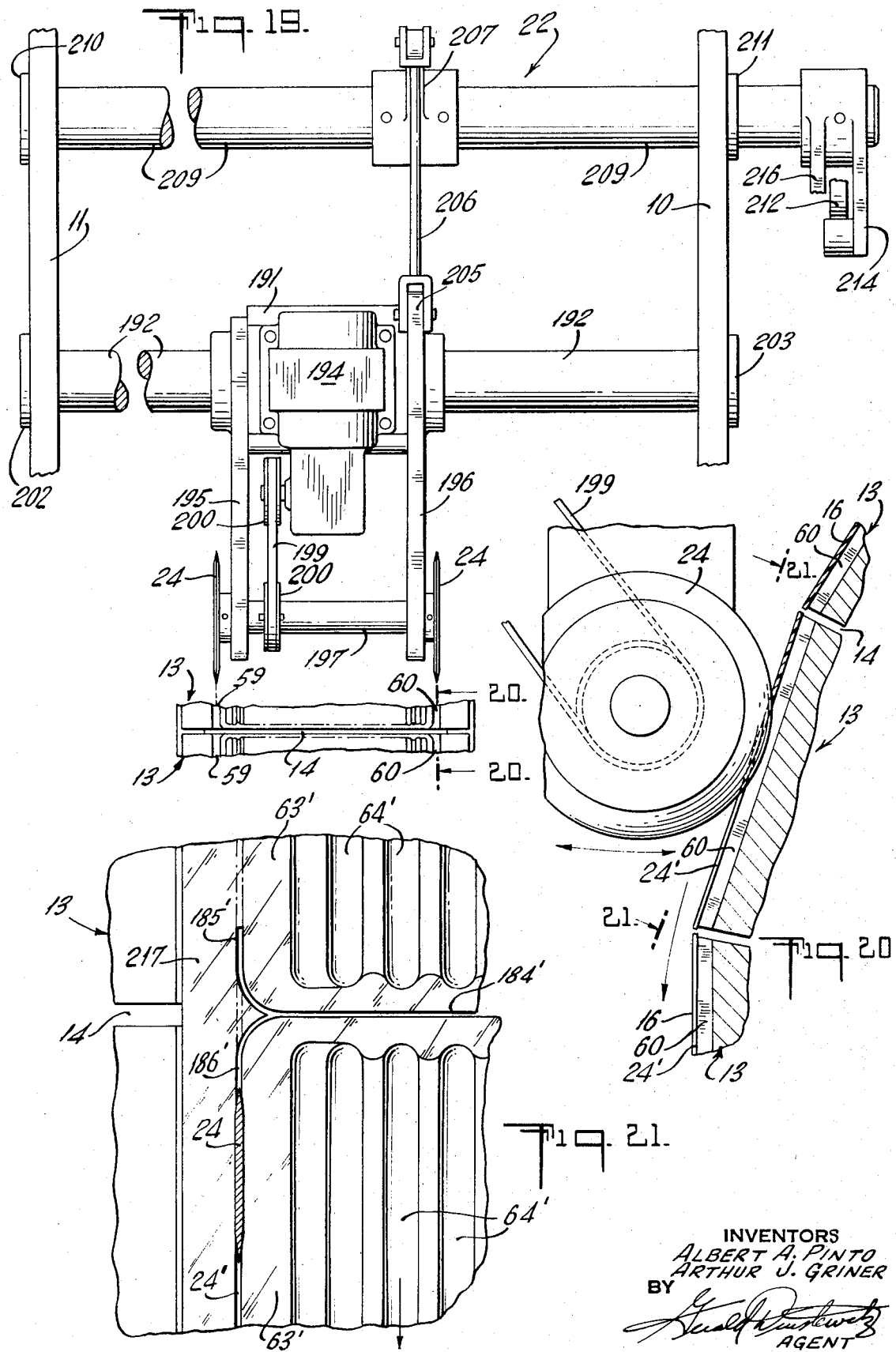

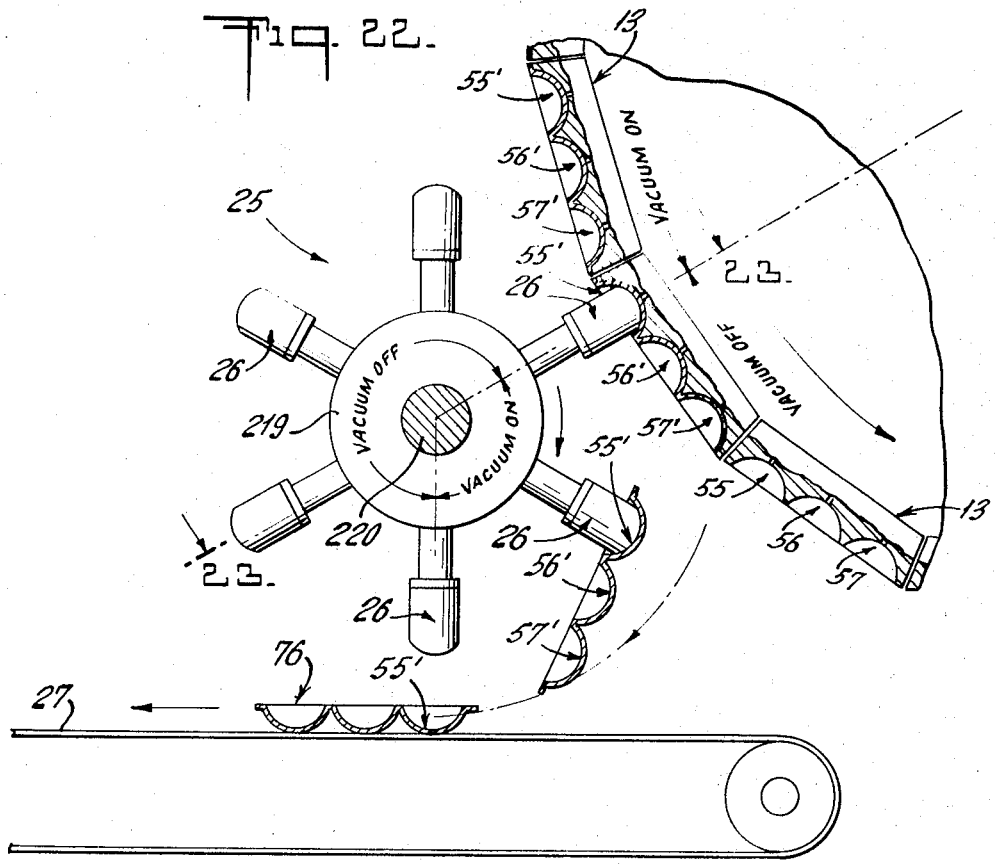
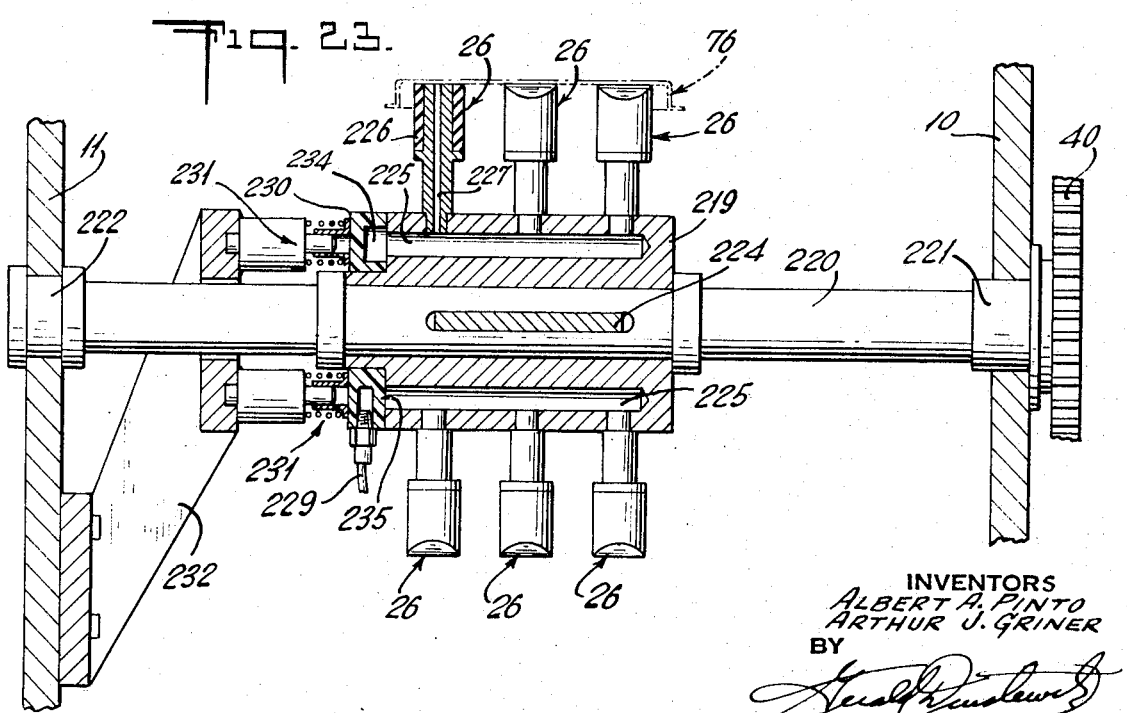

APPARATUS FOR FORMING THIN PLASTIC PACKAGING TRAYS

RELATED U.S. APPLICATION

This is a continuation, of application Ser. No. 96,568, filed Dec. 9, 1970 now abandoned.

BACKGROUND OF THE INVENTION

The present invention relates to vacuum forming of articles from thin plastic material, and, more particularly, to machinery for forming articles having a shape which requires the use of flat faced molds.

The type of article which the present invention is principally concerned with is a generally pan shaped packaging tray having an upper peripheral edge which lies substantially within a single plane. These trays are commonly used in the packaging of articles such as cookies or crackers. The vacuum forming of such trays requires the use of a mold having a flat face upon which the upper peripheral edge of the tray is formed.

In the past, trays of this type have been formed from rectangular sheets of plastic by machines which operate in a reciprocating manner. In the prior art machines a reciprocating mechanism removes a single plastic sheet from a stack and places it on a mold where it is heated and subjected to vacuum to draw the softened plastic into the mold cavity. A reciprocating trimming die then descends upon the mold to remove the surplus plastic at the edges and produce rounded corners on the peripheral edge of the tray. The finished tray is lifted from the mold and transported by another reciprocating mechanism to a conveyor. The tray is subsequently filled with articles and slipped into a tubular envelope which is then sealed to complete the packaging.

The tubular envelope is sized to closely fit the filled tray and is normally made of a thin transparent material such as cellophane. It is extremely important therefore that the corners of the trays be rounded to guide the tray into the envelope and to remove any danger of the envelope being torn by a sharp corner during this operation.

The cost of any product is a function of (among other factors) the cost of the raw materials and the time required to convert the raw materials into the finished product.

The plastic used in the prior art machines is manufactured in long ribbons which must be sliced and stacked for use by a reciprocating machine. The cost of the plastic sheets is therefore significantly higher than a comparable quantity of the ribbon which is merely wound onto a roll.

It is well known that a continuously operating rotary machine is generally capable of faster operation than a reciprocating machine performing the same function. Rotary machines are therefore preferred wherever the function of a machine lends itself to rotary operation because of the decrease in unit cost of the articles manufactured.

It has long been evident that plastic packing trays of the type under discussion would be significantly less expensive if they could be produced by a rotary machine which accepts the raw material plastic in ribbon form. However, there are a number of factors and requirements involved in the production of these trays which mitigate against the use of high speed rotary machinery employing the modes of operation disclosed in the prior art.

United States Pat. No. 3,218,776 issued on Nov. 23, 1965 to C. E. Cloud discloses a rotary machine which represent the state of the art in this general field. The machine utilizes a rotary drum having a cylindrical outer surface in which mold cavities are formed. A ribbon of plastic is fed between a heated roller and the drum and a vacuum draws the softened plastic into the mold cavities. The trays thus formed are filled and wiper blades (mounted in contact with the drum) spread the filling material into the corners of the tray. A second ribbon of plastic is fed between a roller and the drum to seal the packet and a third roller operates to loosen the packet from the mold. A set of stationary knife blades and a set of rotary knives separate adjacent packets and compressed air is employed to drive the packets out of the molds onto a conveyor.

The machine of the type shown in the Cloud patent could not be used to produce the type of packaging tray with which the present invention is concerned for a number of reasons.

The requirement that flat faced molds be used in forming the trays eliminates the possibility of employing a drum with a cylindrical surface against which rollers can operate to handle or work the plastic raw material or the formed trays. The placement of flat faced molds on the outer periphery of a drum produces a surface composed of a series of flat sections which rollers could not follow during high speed operation. Thus, the means shown in the prior art patent for applying the plastic ribbon to the drum, for heating the ribbon, and for securing th plastic during the forming operation could not be used with a machine employing flat face molds.

Some of the other reasons which prevent the Cloud machine from being used for the purposes of this invention are the requirements that the trays be trimmed to provide round corners, that the trays leave the machine empty and are placed on a conveyor in an upright position, and that during the transfer to the conveyor the extremely light weight trays may not be affected by the air currents generated during high speed operation of the machine.

SUMMARY

In view of the foregoing, an object of the present invention is to provide a continuously operating rotary machine for producing thin plastic articles having a shape requiring molding on a flat faced mold.

Another object is to provide such a machine in which a series of flat face molds are mounted on a rotary drum and novel mechanisms are provided for cooperating with said molds to form individual trays from a ribbon of plastic material.

Another object is to provide such a machine including means for depositing the formed trays on a conveyor in position for filling.

Another object is to provide novel apparatus for clamping a sheet of material to the peripheral surface of a rotary drum.

Other and further objects of the invention will be obvious upon an understanding of the illustrative embodiment about to be described, or will be indicated in the appended claims, and various advantages not referred to herein will occur to one skilled in the art upon employment of the invention in practice.

The foregoing objects are generally accomplished by providing a machine comprising a rotary drum carrying a plurality of outwardly facing flat faced vacuum form molds spaced about the periphery of said drum, means for continuously rotating the drum at a uniform speed, means for continuously applying a ribbon of thin plastic material to the drum to cover the molds, means for mechanically clamping the ribbon to the drum, means for heating the ribbon after clamping, means for applying a vacuum to the molds to draw the heated film into the mold, means for trimming and separating the formed trays, and means for removing the individual finished trays.

BRIEF DESCRIPTION OF THE DRAWING

A preferred embodiment of the invention has been chosen for purposes of illustration and description, and is shown in the accompanying drawing, forming a part of the specification, wherein:

FIG. 1 is a front elevational view, partly in section, of a machine according to the present invention showing the position of the major components thereof and illustrating the sequence of operation;

FIG. 2 is a rear elevational view of the machine, also partly in section, further illustrating the construction of the mechanism for operating the jaws which clamp the plastic ribbon during the heating and vacuum forming operations;

FIG. 3 is a view taken along line 3—3 on FIG. 7 showing details of the jaw operating mechanism;

FIG. 4 is a plan view of one of the jaws shown in FIG. 3;

FIG. 5 is a sectional view taken along the line 5—5 on FIG. 4 showing a pair of jaws clamping the plastic ribbon onto a mold block during the heating operation;

FIG. 6 is an enlargement of a portion of FIG. 5;

FIG. 8 is a plan view of a mold block employed on the machine;

FIG. 9 is a sectional view taken along line 9—9 on FIG. 8;

FIG. 10 is a sectional view taken along line 10—10 on FIG. 9;

FIG. 11 is a perspective sectional view of a finished packaging tray with the removed portion of the tray shown in phantom;

FIG. 13 is a view taken along line 13—13 on FIG. 12 showing the cam controlled mechanism which carries and positions the lateral trimming blade;

FIG. 15 is a view taken along line 15—15 on FIG. 14 illustrating the position of the transverse blade relative to a mold block during the trimming operation, the formed tray being deleted from this view for the sake of clarity;

FIG. 16 is a view taken along line 16—16 on FIG. 15 further showing the position of the blade edge with respect to the mold blocks, the formed tray also being deleted from this view;

FIG. 17 is a sectional view taken along line 17—17 on FIG. 16 illustrating the central portion of the transverse blade cutting the sheet material between adjacent mold blocks to separate adjacently formed trays;

FIG. 18 is a view taken along the line 18—18 on FIG. 16 illustrating the end portions of the transverse blade cutting a rounded corner at the edge of a formed tray;

FIG. 19 is a view taken along the line 19—19 on FIG. 1 showing the mechanism controlling the edge trimming knives;

FIG. 20 is an enlarged front view partly in section, taken along the line 20—20 on FIG. 19;

FIG. 21 is a plan view taken along line 21—21 on FIG. 20 illustrating the relationship of the cuts made by the edge trimming knives to those made by the transverse blade;

FIG. 22 is a front elevational view of the mechanism for removing the formed trays from the mold blocks;

FIG. 23 is a sectional view taken along line 23—23 on FIG. 22.

Referring now to the drawings, there is shown a machine in accordance with the present invention for producing the thin plastic packaging trays depicted in FIG. 11. With reference to FIG. 1, a brief description of the machine will now be provided to give a general understanding of its construction and operation to be followed by a detailed description of each mechanism. The machine is assembled on a pair of frame end plates 10 and 11. A rotating drum 12 is mounted between the end plates and carries twenty flat faced vacuum form molds 13 which are mounted about the periphery of the drum to form the outer surface thereof. The molds are spaced apart to provide slots 14 therebetween for reasons described hereinafter. A rotating roller 15 is mounted between the end plates 10 and 11 to guide a ribbon 16 of thin plastic material from a roll (not shown) onto the peripheral surface of the drum to cover the molds 13. On opposite sides of each mold, a clamping assembly 17 is mounted to the drum to clamp the edges of the ribbon 16 to the mold 13. A heating assembly 19 is mounted on the frame member 11 to heat and soften the ribbon as it is rotated past the assembly, and a vacuum is then applied to each mold in turn, as described hereinafter in detail, to draw the softened plastic into the mold cavity. The vacuum forming process converts the ribbon into a series of connected trays having surplus plastic along the edges thereof where the ribbon is clamped. After the trays are vacuum formed, the clamping assembly is released and the vacuum is continuously applied to the molds to hold the trays throughout severing and traimming operations which follow. A transverse severing mechanism 20 is positioned adjacent to the top of the drum and repetitively moves a heated blade 21 through a closed curvilinear path to sequentially mesh with each of the slots 14 as they pass and thus sever the plastic strip connecting adjacent trays. The surplus plastic at the edges of the trays is next removed by the operation of an edge trimming mechanism 22 which includes a pair of rotating knives 24. The finished trays are removed from the drum by a rotating picking wheel 25 having a plurality of vacuum picking arms 26 which engage the trays and transfer them to a conveyor belt 27.

Figure 7:
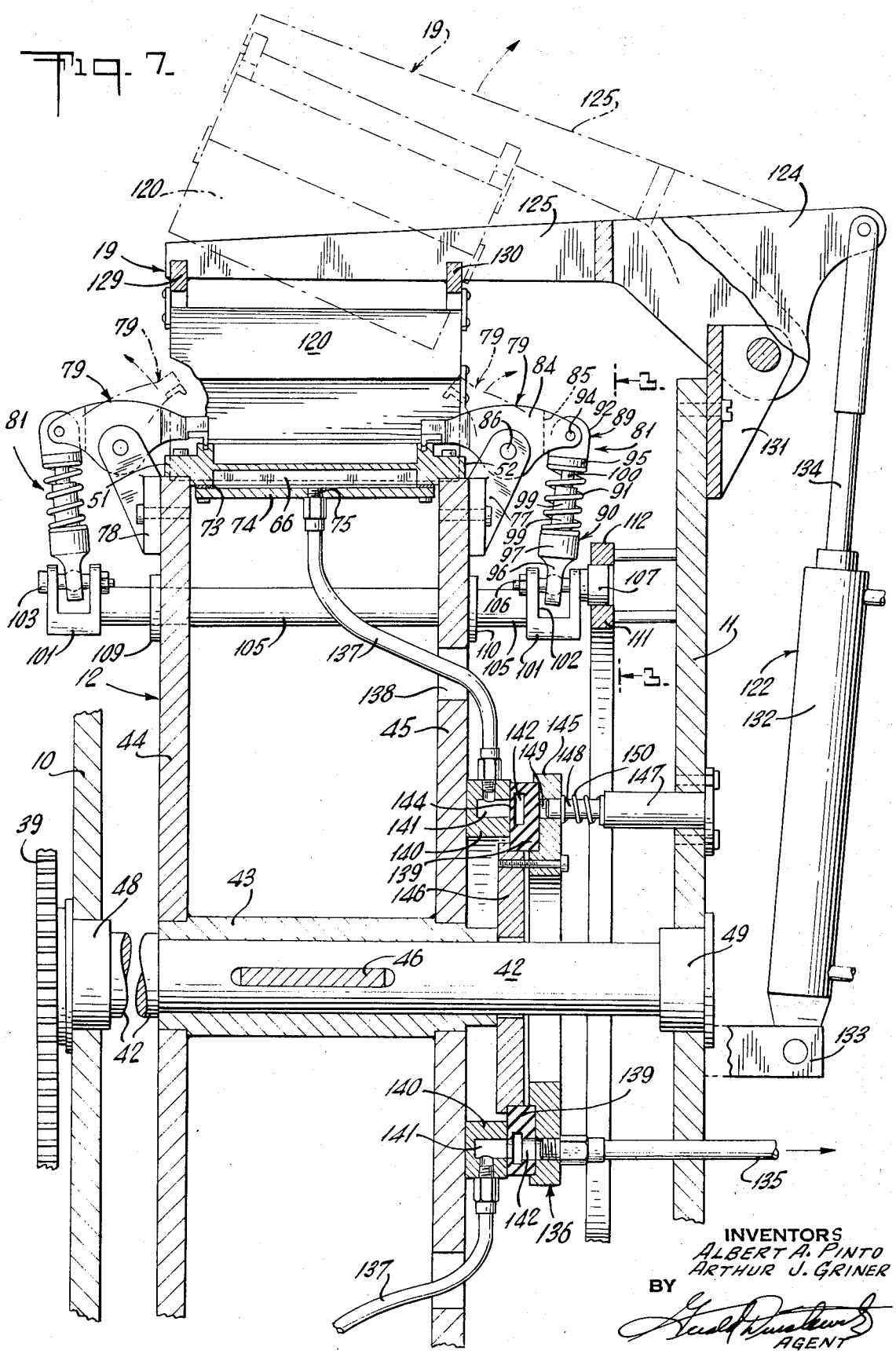
FIG. 7 is a sectional view taken along line 7—7 of FIG. 1 showing the construction of several mechanisms of the machine and the condition of these mechanisms during the heating operation.

The drum 12, the feeding roll 15, and the picking wheel 25 are driven by an electrical motor 29 through a speed reducing gear The 30. the input shaft 31 of the gear train is driven by the motor through a belt 32. A gear 34 mounted on the output shaft of the gear train drives a train of three gears 35, 36 and 37 of equal diameter. The gear 35 engages and drives a gear 38 mounted on the shaft of the roller 15. The gear 36 engages and drives a gear 39 connected to the drum 12. The gear 37 engages and drives a gear 40 connected to the picking wheel 25. The motor 29 and the gear train 30 are mounted between the end plates 10 and 11 while the gears 34 through 40 are positioned adjacent the outside surface of the end plate 10.

THE DRUM 12

Referring now to FIG. 7, the drum 12 is mounted on a shaft 42 extending between the frame plates 10 and 11 and comprises a sleeve 43 and a pair of end walls 44 and 45 which are welded to opposite ends of the sleeve. The sleeve 43 is locked to the shaft 42 by a key 46 and the shaft is journalled in bearings 48 and 49 carried by the end plates 10 and 11. The gear 39 is secured to the left end of the shaft as viewed in FIG. 7. The outer periphery of each of the end walls 44 and 45 consists of twenty flat surfaces 50 of equal length (see FIG. 3) upon which the molds 13 are mounted.

THE MOLDS 13

As shown in FIGS. 8 through 10, each of the molds 13 are of flat rectangular construction having end flanges 51 and 52 provided with bolt holds 53 (by means of which the molds are mounted to the drum) and having a center cavity section 54. Three elongated cavities 55, 56 and 57 formed in the cavity section 54 extend across the mold between the flanges. A pair of grooves 59 and 60 formed in the top surface of the mold define the edges of the cavity section 54. The ends of the grooves flare inwardly to produce beveled corners 61 on the cavity section to allow the transverse severing mechanism 20 to produce rounded corners on the trays as described hereinafter.

The cavity section 54 is provided with an upper flat surface 63 which extends completely around the periphery of the cavity section and around each of the cavities 55, 56 and 57. The cavities 55, 56 and 57 are semi-circular in cross section and are formed with a series of grooves 64 spaced along the length thereof. The cavity 56 is formed with a longitudinal groove 65 extending along the bottom thereof to add stiffness to the finished tray. A large rectangular cavity 66 is provided in the bottom of the mold and is connected to each of the cavities 55–57 by a series of passageways 67. Rectangular formations 69 and 70 are provided on the lower surface of the flanges 51 and 52 along the edges of the cavity 64 to engage the inner surfaces of the drum end walls 44 and 45. As shown in FIGS. 5, 7, 12 and 15, the flanges 51 and 52 extend over and are bolted to the flat surfaces 50 of the drum end walls. THe lower cavity 66 of each mold 13 is sealed by means of a gasket 73 and a plate 74 bolted to the underside of the mold. A threaded bore 75 is provided in each of the plates 74 for connecting a vacuum line thereto.

Referring now to FIG. 11, the elements of the finished tray 76 are given reference numerals which correspond to the portions of the mold 13 which shaped those elements of the tray. Thus the trays have depressions 55', 56', 57' which are provided with semicircular grooves 64', and an upper flat surface 63' extends around the edge of the tray and around each of the depressions 55' to 57'.

THE CLAMPING MECHANISMS

A clamping assembly 17 is positioned on each side of each of the molds 13 as shown in FIGS. 3 to 7, the assemblies 17 includes a pair of brackets 77 and 78 mounted to the outer face of one of the drum end walls at one side of a mold 13, a jaw member 79 pivotally mounted on the brackets 77 and 78, and a jaw operating linkage 81. The jaw member 79 has a wide head 82 and a narrow shank 84 provided with a slot 85 at the end thereof. The jaw member pivots on a pin 86 extending through the brackets 77, 78 and the shank 84. As best seen in FIG. 6, the head 82 is provided with a rounded contacting edge 87 which aligns with the groove 59 (or 60) when the jaw is pivoted against the mold, to clamp the plastic ribbon 16 between the edge 87 and the edges of the groove 59 (or 60).

The linkage 81 includes a pair of interconnected members 89 and 90 having limited telescopic movement and a spring 91 normally holding the linkage in the fully extended position. The member 89 is provided with a flat eye end portion 92 which extends into the slot 85 and is connected to the jaw member by a pin 94. At the inner end of the eye portion 92 a shoulder 95 is formed for engaging one end of the spring 91. THe member 90 likewise is provided with an eye portion 96 (FIG. 7) and a shoulder 97 for engaging the spring 91. The member 90 includes a tubular portion 99 which receives a rod 100 of the member 89 to provide the telescopic movement. The end of rod 100 and the interior of the member 90 are provided with interfering formations (not shown) to limit the relative movement between the members 89 and 90.

The eye portion 96 of the member 90 is connected to a link arm 101 as shown in FIG. 7. The link arms 101 have a slot 102 at one end thereof for receiving the eye portion 96 and have a bore 104 (FIG. 3) at the other end for receiving a shaft 105. Referring again to FIG. 7, all of the link arms 101 associated with the clamping assemblies mounted on the drum end wall 44 are attached to their respective eye portions 96 by a bolt 103 having a conventional head, while the link arms 101 positioned on the other side of the drum are attached by means of a bolt 106 which has a cam following wheel 107 secured to the head thereof.

The link arms 101 of clamping assemblies 17 positioned to engage opposite sides of the same mold engage opposite ends of the same shaft 105 which extends through the end walls 44 and 45 and is mounted in bearings 109 and 110 carried thereby. The link arms 101 are rigidly attached to the shaft 105 so that the shaft and two links rotate as a unit.

As shown in FIGS. 2, 3 and 7, inner and outer cam tracks 111 and 112 are mounted on the inner wall of the end plate 11 to control the operation of the clamping assemblies 17. The cam tracks are radially spaced from each other to provide a path 113 therebetween in which the cam following wheels 107 ride. As the drum 12 rotates, the wheels 107 move with the drum and their radial position with respect to the axis of rotation of the drum is changed by the stationary cam tracks 111, 112 to operate the jaw members. The path 113 has four different sections: a circular section 114 of large radius during which the jaw members are clamped; a longer circular section 115 of lesser radius during which the jaws are open, and two short transition sections 116 and 117.

As the ribbon 16 is applied to each mold, the section 116 of the cam path 113 moves the wheel 107 associated with that mold outwardly causing the link arms 101 and the shaft 105 to rotate about the axis of the shaft 105. The link arms 101 move the linkage 81 outwardly to pivot the jaw members into the position shown in FIG. 5 to clamp the ribbon to the mold. The spring loaded linkage 81 insures that a uniform clamping pressure is applied without the need for close tolerances. The jaw members remain in the clamped position while the wheel 107 travels through the path section 114. After the vacuum forming operation is completed, the cam tracks move the wheel 107 inwardly through path section 117 and the link arms 101 and shaft 105 are rotated in the opposite direction to move the jaw members into the open position. The jaw members then remain in the open position throughout the section 115 of the cam path.

THE HEATING ASSEMBLY 19

With reference to FIGS. 1, 2, and 7, the heating assembly includes a pair of radiant electric heater units 119 and 120, a pivoted supporting frame 121 and a pneumatic actuator 122 for pivoting the frame. The supporting frame 121 comprises a pair of arms 124 and 125 which are joined by a cross member 126. The arms 124 and 125 each carry a pair of outwardly extending bars 127, 128 and 129, 130 respectively, to which the heaters are connected. The arms 124 and 125 are pivotally mounted on a bracket 131 which is bolted to the end plate 11. The pneumatic actuator 122 includes a cylinder 132 pivotally secured to the end plate 11 by means of a bracket 133 and a piston within the cylinder mounted upon a rod 134 which is pivotally connected to the arm 124 of the heater supporting frame. When the machine is operating, compressed air is introduced into the bottom of the cylinder 132 to drive the piston upwardly and rotate the heaters into the position shown in solid lines in the drawings. In this position, the heaters warm the plastic ribbon as it passes beneath them and the plastic is softened in preparation for the vacuum forming process. When the machine stops, compressed air is introduced into the top of the cylinder to drive the piston downwardly and pivot the heaters away from the ribbon to prevent the ribbon from being melted.

THE VACUUM FORMING APPARATUS

As shown in FIG. 7, a vacuum line 135 is consecutively connected through a rotary coupling and valve assembly 136 to each one of twenty hoses 137 extending through holes 138 in the drum wall 45 to the individual molds 13. The rotary coupling and valve assembly 136 includes a stationary circular manifold 139 mounted to the end plate 11 and a rotating collecting ring 140 welded to the end wall 45 of the drum. The collecting ring 140 is provided with twenty recesses 141 each connected to one of the hoses 137 and each facing the manifold 139. The manifold 139 is provided with a annular passageway 142 which is closed off from the recesses 141 by a wall section 144 throughout a portion of the manifold. As each mold rotates through that portion of a revolution indicated as "vacuum off" in FIG. 1, the respective recess 141 moves along the portion of the manifold provided with the wall section 144. When each mold is rotating through the portion of a revolution indicated as "vacuum on" in FIG. 1, the recess 141 is in fluid flow communication with the passageway 142 and the vacuum line 135 is connected to lower cavity 66 in the molds. The vacuum in the cavity 66 draws the softened plastic sheet into the cavities 55-57 and holds the plastic trays thus formed in the mold 13.

The manifold 139 is clamped between an outer ring 145 and an inner ring 146. The outer ring 145 is supported by a plurality of stepped pins 147 (one of which is shown) mounted to the end plate 11. The pins 147 have a large diameter base portion and a small diameter end portion 148 extending into bores 149 provided in the manifold 139. Coil springs 150 are positioned on the pin portions 148 to urge the manifold 139 against the ring collector 140 to provide a fluid seal therebetween.

Referring again to FIG. 1, the vacuum forming of each tray takes place between the time the vacuum is connected to the mold and the time the clamping jaws are opened. The vacuum connection to the mold is maintained to hold the tray is place throughout the severing and trimming operations and until the trays are removed by the picking wheel 25.

THE TRANSVERSE SEVERING MECHANISM 20

Figure 14:
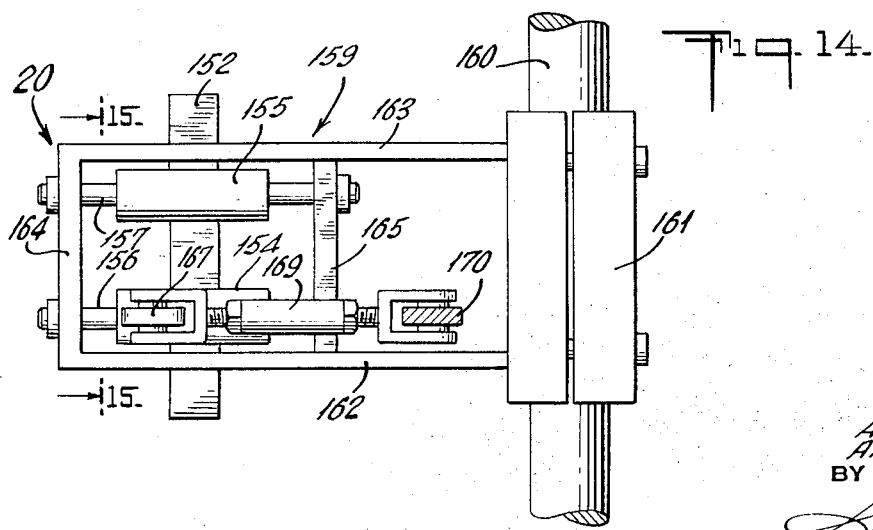
FIG. 14 is a view taken along line 14—14 on FIG. 13 providing a plan view of the blade positioning mechanism.

Referring to FIGS. 13 and 14, the heated blade 21 is bolted to a block 152 which is welded to a pair of sleeves 154 and 155 which are disposed at right angles to the block 152 and slide upon rods 156 and 157 respectively. The rods 156 and 157 are supported by an open rectangular frame 159 which extends from a rotatably oscillating shaft 160. The frame 159 includes a two piece clamp 161 secured to the shaft 160, a pair of side members 162 and 163 extending from the clamp 161 at right angles to the shaft 160, and a member 164 joining the side members 162 and 163 at their free ends. The rods 156 and 157 extend from the end member 164 to a cross member 165 positioned between the side members 162 and 163.

The sleeve 154 is provided with a lug 167 which is connected through a turnbuckle link 169 to a lever arm 170 that is clamped to a rotatably oscillating shaft 171.

Figure 12:
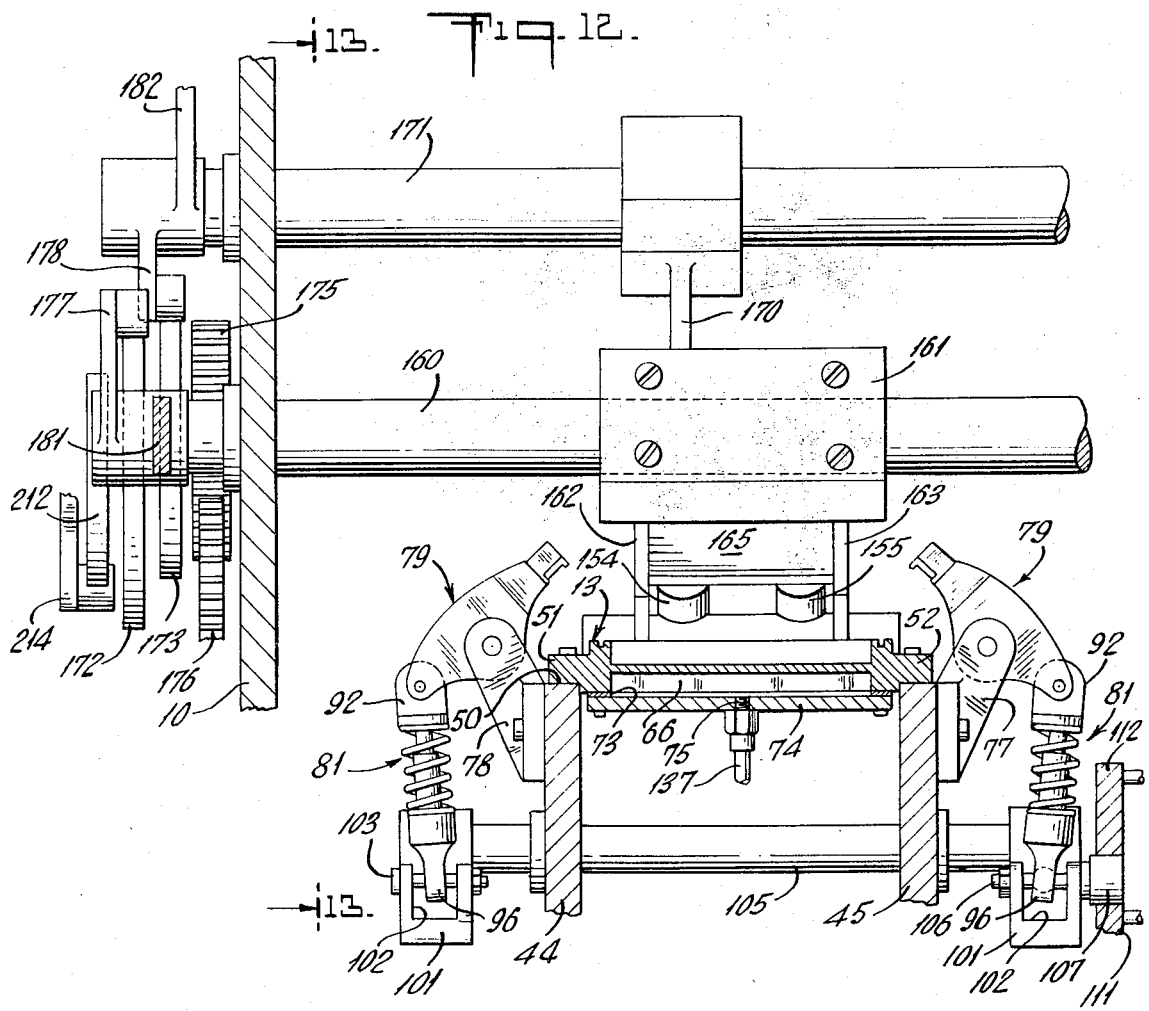
FIG. 12 is a view taken along line 12—12 on FIG. 1 showing the condition of the clamping jaws just prior to trimming the formed tray, and also showing the cam arrangements controlling the movement of the trimming blades.

The position of the blade 21 is controlled by the angular orientation of the shafts 160 and 171. Rotation of the shaft 160 moves the blade 21 toward and away from the drum 12. Rotation of the shaft 171 moves the blade tangentially with respect to the drum circumference. The angular orientation of the shafts 160 and 171 is controlled by a conventional cam arrangement. With reference to FIGS. 1 and 12, a pair of cams 172 and 173 are mounted on a common shaft 174 with a gear 175. The gear 175 is driven from the gear 39 through a dual gear 176 having inner and outer sets of teeth. The shafts 160 and 171 are respectively provided with cam follower arms 177 and 178 which rotatably oscillate the shafts against the action of springs 179 and 180 operating upon lever arms 181 and 182 secured to he shafts. The shafts 160 and 171 are rotated by the cams to continuously move the blade in an elliptical path which is synchronized with the rotation of the drum.

As each slot 14 moves under the mechanism 20, the blade 21 moves both toward the drum and in the direction of drum rotation, enters into the slot 14 to sever the plastic strip connecting adjacent trays, and moves out of the slot while continuing the tangential motion. The blade continues its outward movement while reversing its tangential motion, and finally moves inwardly while continuing this tangential motion to complete the elipse.

Referring now to FIGS. 15 through 18, the blade 21 has a central section providing a long straight severing edge 184 and has end sections providing forked severing edges formed by a pair of edge sections 185, 186 and 187, 188 respectively which curve in opposite directions from the edge 184 through a 90 degree turn. During the severing operation, the straight severing edge 184 moves into the slot 14 to sever the plastic strip 190 (FIG. 17) which joins the adjacent formed trays while the edge sections 185, 186 and 187, 188 extend into the grooves 59 and 60 to provide rounded corners on the trays.

THE EDGE TRIMMING MECHANISM 22

Referring now to FIGS. 1 and 19, the edge trimming mechanism includes a sleeve 191 mounted on a shaft 192 extending between the end plates 10 and 11, an electric motor 194 bolted to the sleeve, and a pair of arms 195, 196 extending downwardly from the sleeve and supporting a shaft 197 on which the rotating knives 24 are mounted. The blades 24 are positioned to extend into the grooves 59 and 60 on each side of the molds 13 and are driven by the motor 194 through a belt 199 and pulleys 200 and 201 to trim off the excess plastic along the edges of the trays. The sleeve 191 is keyed to the shaft 192 which is mounted in bearings 202 and 203 to allow the blades 24 to be rotated about the axis of the shaft 192. A third arm 205, formed integrally with the arm 196, extends generally horizontally from the sleeve 191 and is connected through a link 206 to an arm 207 mounted upon a shaft 209. The position of the knife blades 24 is thus controlled by the angular orientation of the shaft 209. The shaft 209 is journalled in bearings 210 and 211 mounted in the end plates 10 and 11 and extends past the end plate 10. The angular position of the shaft 209 is controlled by a cam element 212 (FIGS. 1 & 12) mounted on the shaft 174. A cam following arm 214 mounted to the shaft 192 is held against the cam element 212 by a spring 215 acting through an arm 216 to rotate the shaft 209 in accordance with the configuration of the cam element 212. The knife blades 24 are thus moved toward and away from the drum (FIG. 20) so as to maintain the penetration of the knives into the grooves 59 and 60 constant as the flat faces of the molds 13 moves past the knives.

As shown in FIG. 21, the transverse severing blade 21 produces a slit in the plastic sheet 16 corresponding to the respective portions of the edge of the blade. The slit includes a straight portion 184', a first forked end portion composed of slit sections 185' and 186', and a corresponding second forked end portion which is not shown. The blades 24 produce slits, one of which is shown at 24', which are aligned with the extreme ends of the forked end portions (185', 186') and therefore completely separate the individual trays as they trim off a strip 217 of excess plastic at each edge of the trays.

THE PICKING WHEEL 25

Referring to FIGS. 22 and 23, the picking wheel 25 includes a hub 219 mounted on a shaft 220 which also carries the gear 40. The shaft 220 is mounted in bearings 221 and 222 positioned in the end plates 10 and 11 respectively and the hub 219 is locked to the shaft by means of a key 224. The hub is provided with six bores 225 extending parallel to the shaft (two of which are shown in FIG. 23) and three vacuum picking arms 26 are connected to each of the bores 225. Each of the picking arms is provided with a rubber head 226 which is curved as shown in FIG. 22 to mate with the depressions 55' of the trays 76 and a passageway 227 extends through the arm from the bore 225 to the outer edge of the head 226. The bores 225 are connected to a vacuum line 229 through a stationary manifold ring 230 which is pressed against the end of the hub 219 by a plurality of spring loaded connectors 231 supported by a frame member 232. The manifold ring 230 is provided with an annular passageway 234 which is closed off from the bores 225 by a wall section 235 throughout a portion of the manifold. As each bore 225 rotates through that portion of a revolution indicated as "vacuum off" in FIG. 22, it is moving along the portion of the manifold provided with the wall section 235. The wheel 25 is driven in synchronism with the drum so that a row of picking arms 26 extends into the depression 55' of each of the finished trays 76 as it passes by on the drum. At the time that a row of arms 26 engages the trays 76, the bore 225 associated with those arms moves into communication with the passageway 234 in the manifold 230. At this time the vacuum holding that tray in its mold is turned off. The tray is thus transferred from the drum to the picking wheel 25 and carried by the arms 26 to a position above the conveyor belt 27. At this point the vacuum to the arms 26 is turned off and the tray 76 drops onto the conveyor belt, properly positioned for subsequent filling and packaging, at a distance sufficient to prevent air currents generated by the rotating drum from disturbing the tray.

It will be seen from the foregoing that the present invention provides a continuously operating rotary machine for producing thin plastic packing trays, wherein the trays are formed in flat faced molds and novel mechanisms are provided for cooperating with the molds to form trays from a ribbon of plastic material, and wherein means are included for depositing the formed trays on a conveyor in position for filling.

As various changes may be made in the form, construction and arrangement of the parts herein, without departing from the spirit and scope of the invention, and without sacrificing any of its advantages, it is to be understood that all matter herein is to be interpreted as illustrated and not in any limiting sense.

What is claimed is:

1. A machine for continuously forming thin plastic articles having a shape requiring molding on a flat faced mold comprising a rotary drum carrying a plurality of outwardly facing flat faced vacuum form molds spaced about the periphery of said drum, means providing a transverse slot between adjacent molds, means for continuously rotating said drum at a uniform speed, means for continuously applying a ribbon of thin plastic material to said drum to cover said molds, means for vacuum forming the ribbon into a series of plastic articles connected together at said transverse slots, and transverse severing means mounted immediately adjacent said drum including a blade and means for moving said blade in a repetitive elongated closed path to consecutively enter each of said slots and sever the plastic ribbon extending across each of said slots, said blade moving means including means for moving said blade first toward and then away from said drum and means for moving said blade in the direction of rotation of said drum while the blade is moved toward and away from said drum so as to match the speed of said blade to that of said drum as the blade enters and leaves each of said slots.

2. A machine according to claim 1 wherein said means for moving said blade includes a pivoted arm adjacent said drum, means for rotating said arm toward and away from said drum, means slideably mounting said blade on said arm for tangential motion with respect to said drum, and means for tangentially moving said blade in synchronization with the motion of said arm and said drum.

3. A machine for continuously forming thin plastic articles having a dished configuration with an upper peripheral edge lying within a plane comprising a rotary drum carrying a plurality of outwardly facing flat faced vacuum form molds spaced about the periphery of said drum, each mold includes a cavity and a surface surrounding said cavity, means for continuously rotating said drum at a uniform speed, means for continuously applying a ribbon of thin plastic material to the drum to cover said molds, means for mechanically clamping the ribbon to said molds during a portion of each revolution of said drum, means for heating said ribbon during said portion, vacuum producing means for drawing the heated film into said cavities to form said articles, and severing means for trimming and separating said articles while on said drum said clamping means including a plurality of clamps carried by said drum, a pair of clamps being provided for each of said molds, and a cam mechanism for consecutively operating each pair of clamps to clamp a section of the ribbon before that section is heated and to disengage after the articles are formed and before the operation of said severing means, the clamps of each of said pairs being mounted on opposite sides of said mold.

4. A machine according to claim 3 wherein a transverse slot is provided between adjacent molds and each mold is provided with a pair of grooves extending along opposite edges of said mold and intersecting said slots at right angles, each of said clamps are provided with a jaw member having a ribbon contacting edge aligned with one of said grooves to clamp the ribbon between said contacting edge and the edges of said groove, and knife means positioned within each of said grooves to trim the edges of said ribbon after said clamps have disengaged said ribbon.

5. A machine according to claim 4 wherein said severing means includes transverse severing means, said transverse severing means being mounted immediately adjacent said drum and including a blade and means for moving said blade in a repetitive elongated closed path to consecutively enter each of said slots and sever the plastic extending across each of said slots.

6. A machine according to claim 5 wherein said blade has a straight central portion and forked end portions, said central portion being received by said slots during the severing operations, said end portions each providing a pair of severing edges curving in opposite directions from said central portion through a 90 degree turn to be received by said grooves during the severing operations and thus provide rounded corners on said articles.

7. A machine according to claim 4 wherein said edge trimming means includes a knife positioning mechanism for maintaining the penetration of said knife means into said grooves substantially constant as said molds move past said knives.

8. A machine for forming thin plastic articles comprising a rotary drum carrying a plurality of outwardly facing vacuum form molds spaced about the periphery of said drum, each of said molds being provided with a cavity and a surface surrounding said cavity defining a flat plane, means for continuously rotating said drum at a uniform speed, means for continuously applying a ribbon of thin plastic material to the drum to cover said molds, means for mechanically clamping the ribbon to said molds during a portion of each revolution of said drum, means for heating said ribbon during said portion, vacuum producing means for drawing the heated film into said cavities to form said articles, severing means for trimming and separating said articles, and vacuum operated picking means adjacent said drum for removing said articles from said molds including a rotary coupling and at least one vacuum arm extending radially from said coupling to consecutively engage each of the articles in said cavities, said coupling being driven to continuously rotate through 360° in synchronism with said drum and including valving to render said vacuum arm effective from the point of engagement with an article through a portion of a revolution of said coupling to a discharge point, whereby the articles are consecutively removed from said drum and transported to the discharge point.

9. A machine according to claim 8 wherein said valving in said rotary coupling renders said vacuum arm ineffective when said arm extends vertically downward and wherein a conveyor is positioned beneath said picking means, whereby the articles are deposited on said conveyor in an upright position convenient for subsequent filling.

10. A machine for continuously forming thin plastic articles having a dished configuration with an upper peripheral edge lying within a plane comprising a rotary drum carrying a plurality of outwardly facing flat faced vacuum form molds spaced about the periphery of said drum, each mold includes a cavity and a surface surrounding said cavity, means for continuously rotating said drum at a uniform speed, means for continuously applying a ribbon of thin plastic material to the drum to cover said molds, means for mechanically clamping the ribbon to said molds during a portion of each revolution of said drum means for heating said ribbon during said portion, vacuum producing means for drawing the heated film into said cavities to form said articles, and severing means for trimming said articles while on said drum, said clamping means including a plurality of clamps carried by said drum, a pair of clamps being provided for each of said molds, and a cam mechanism for consecutively operating each pair of clamps to clamp a section of the ribbon before that section is heated and to disengage after the articles are formed and before the operation of said severing means, the clamps of each of said pairs being mounted on opposite sides of said mold, each mold being provided with a pair of grooves extending along opposite edges of said mold, each of said clamps being provided with a jaw member having a ribbon contacting edge aligned with one of said grooves to clamp the ribbon between said contacting edge and to the edges of said groove, said severing means including knife means positioned within each of said grooves to trim the edges of said ribbon after said clamps have disengaged said ribbon.

\* \* \* \* \*

UNITED STATES PATENT OFFICE
CERTIFICATE OF CORRECTION

Patent No. 3,771,938              Dated November 13, 1973

Inventor(s) ALBERT A. PINTO, ET. AL.

It is certified that error appears in the above-identified patent and that said Letters Patent are hereby corrected as shown below:

On the cover sheet, insert -- [73] Assignee:

Nabisco, Inc., a corporation of New Jersey -- .

Signed and sealed this 6th day of August 1974.

(SEAL)
Attest:

McCOY M. GIBSON, JR.               C. MARSHALL DANN
Attesting Officer                  Commissioner of Patents